(12) United States Patent
Ren et al.

(10) Patent No.: US 12,056,582 B2
(45) Date of Patent: Aug. 6, 2024

(54) METHOD AND DEVICE FOR TRAINING A MODEL BASED ON FEDERATED LEARNING

(71) Applicant: Beijing Baidu Netcom Science and Technology Co., Ltd., Beijing (CN)

(72) Inventors: Bing Ren, Beijing (CN); Shengwen Yang, Beijing (CN); Xuhui Zhou, Beijing (CN)

(73) Assignee: Beijing Baidu Netcom Science and Technology Co., LTD, Beijing (CN)

( * ) Notice: Subject to any disclaimer, the term of this patent is extended or adjusted under 35 U.S.C. 154(b) by 1057 days.

(21) Appl. No.: 16/921,207

(22) Filed: Jul. 6, 2020

(65) Prior Publication Data

US 2021/0004718 A1    Jan. 7, 2021

(30) Foreign Application Priority Data

Jul. 3, 2019   (CN) .......................... 201910597881.2

(51) Int. Cl.
*G06N 20/00*        (2019.01)
*G06F 21/60*        (2013.01)
(Continued)

(52) U.S. Cl.
CPC ........... *G06N 20/00* (2019.01); *G06F 21/602* (2013.01); *H04L 9/008* (2013.01); *H04L 9/0825* (2013.01);
(Continued)

(58) Field of Classification Search
CPC ..... H04L 9/008; H04L 9/3073; H04L 9/0825; G06F 21/602; G06F 2221/2107; G06N 20/00
See application file for complete search history.

(56) References Cited

U.S. PATENT DOCUMENTS

2017/0310643 A1* 10/2017 Hardy .................... H04L 9/008
2018/0219842 A1*  8/2018 Bellala ................... H04L 67/12
(Continued)

FOREIGN PATENT DOCUMENTS

CN        109167695 A        1/2019
CN        109886417 A        6/2019

OTHER PUBLICATIONS

Yang et al. "Federated Machine Learning: Concept and Applications", ACM Trans. Intell. Syst. Technol. 10,2, Article 12, 19 pages Jan. 2019. (Year: 2019).*

(Continued)

*Primary Examiner* — Renee D Chavez
*Assistant Examiner* — Jianmei F Duckworth
(74) *Attorney, Agent, or Firm* — Banner & Witcoff, Ltd.

(57) ABSTRACT

A method and device for training a model based on federated learning are provided. The method includes: receiving a second original independent variable calculated value from a second data provider device; the second original independent variable calculated value being calculated by the second data provider device according to a second original independent variable and a second model parameter; calculating a dependent variable estimation value according to a first model parameter initial value of a first provider device, a first original independent variable of the first data provider device, and the second original independent variable calculated value; calculating a difference between a dependent variable of the first data provider device and the dependent variable estimation value; calculating a gradient of a loss function with respect to a first model parameter, according to the difference; and updating the first model parameter according to the gradient of the loss function with respect to the first model parameter.

16 Claims, 8 Drawing Sheets

(51) Int. Cl.
  *H04L 9/00* (2022.01)
  *H04L 9/08* (2006.01)
  *H04L 9/30* (2006.01)

(52) U.S. Cl.
  CPC .... *H04L 9/3073* (2013.01); *G06F 2221/2107* (2013.01)

(56) References Cited

U.S. PATENT DOCUMENTS

2019/0012592 A1  1/2019 Beser et al.
2020/0403781 A1* 12/2020 Gentry ............... H04N 21/2353

OTHER PUBLICATIONS

Du et al. "Privacy-Preserving Multivariate Statistical Analysis: Linear Regression and Classification", Proceedings of the 2004 SIAM international conference on data mining, pp. 222-233, SIAM international conf. on data mining. (Year: 2004).*
Zhang Shu-Guang et al., "Security Deduplication Method of Encrypted Data Without Any Additional Server," Journal of Cryptologic Research, Jun. 2018, vol. 5, No. 3: 286-296, pp. 1-11.
Feb. 28, 2024—(CN) Supplemental Search Report—App. No. 2019105978812.

* cited by examiner

METHOD AND DEVICE FOR TRAINING A MODEL BASED ON FEDERATED LEARNING

CROSS-REFERENCE TO RELATED APPLICATION

This application claims priority to Chinese patent application No. 201910597881.2, filed on Jul. 3, 2019, which is hereby incorporated by reference in its entirety.

TECHNICAL FIELD

The present application relates to a field of computer technology, and in particular, to a method and device for training a model based on federated learning.

BACKGROUNDS

With the development of Internet technology, data sharing becomes more and more popular. Different data owners may have data sharing requirements among themselves. In order to realize that original data is not shared, but the data can still be used during data sharing, a concept of federated learning is proposed.

Federal learning is a new type of distributed learning mechanism that allows a model training based on discrete data corpuses owned by different data providers, without causing original data to be shared or leaked. According to characteristics of data distribution, the federated learning may be divided into three types: horizontal federated learning, vertical federated learning, and federated transfer learning.

In the vertical federated learning, two data providers send data to a third-party collaborator, and then the third-party collaborator sends related model parameters and public keys to the two data providers, both of which are also data receivers. Here, the data sharing relates to three parties, where the third-party collaborator must be trusted by the two data providers and there must be no danger of a data leakage. The mode with a collaborator is based on a strong assumption: both a data provider and a data demander must trust a third-party collaborator, and the third-party collaborator will not actively or passively cause data to be leaked in any form. But this strong assumption is very difficult to satisfy.

SUMMARY

A method and device for training a model based on federated learning are provided according to embodiments of the present application, to solve one or more technical problems in the existing technology.

In a first aspect, a method for training a model based on federated learning is provided according to an embodiment of the application. The method includes:
  receiving a second original independent variable calculated value from a second data provider device; the second original independent variable calculated value being calculated by the second data provider device according to the second original independent variable and a second model parameter;
  calculating a dependent variable estimation value according to a first model parameter initial value of a first provider device, a first original independent variable of the first data provider device, and the second original independent variable calculated value;
  calculating a difference between a dependent variable of the first data provider device and the dependent variable estimation value;
  calculating a gradient of a loss function with respect to a first model parameter, according to the difference; and
  updating the first model parameter according to the gradient of the loss function with respect to the first model parameter.

In an implementation, before the receiving a second original independent variable calculated value from the second data provider device, the method further includes:
  generating a pair of keys, and sending a public key in the pair of keys to the second data provider device; and
  after the calculating a difference between a dependent variable of the first data provider device and the dependent variable estimation value, the method further includes:
  encrypting the difference by using a private key in the pair of keys to obtain an encrypted difference, and sending the encrypted difference to the second data provider device;
  receiving an encrypted gradient of a loss function with respect to a second model parameter from the second data provider device, wherein the encrypted gradient of the loss function with respect to the second model parameter is obtained by the second data provider device performing a calculation on a random number and the encrypted difference with the public key;
  decrypting, by using the private key in the pair of keys, the encrypted gradient of the loss function with respect to the second model parameter, to obtain a sum of the random number and the gradient of the loss function with respect to the second model parameter; and
  sending the sum of the random number and the gradient of the loss function with respect to the second model parameter to the second data provider device.

In an implementation, the calculating a dependent variable estimation value according to a first model parameter initial value of a first provider device, a first original independent variable of the first data provider device, and the second original independent variable calculated value includes:
  obtaining a first original independent variable calculated value according to the first model parameter initial value of the first provider device and the first original independent variable of the first data provider device;
  adding the first original independent variable calculated value and the second original independent variable calculated value, to obtain an independent variable; and
  obtaining the dependent variable estimation value by calculating a sigmoid function value of the independent variable.

In an implementation, the calculating a gradient of a loss function with respect to a first model parameter, according to the difference includes:
  calculating the gradient of the loss function with respect to the first model parameter according to a following formula:

$$\frac{\partial L}{\partial \Theta^A} = -\frac{1}{n}\sum_{i=1}^{n}(y_i - h_\Theta(x_{i1}))x_i^A;$$

where n is a number of the dependent variables, $y_i$ is an original dependent variable, $x_i^A$ is a first original independent variable, $h_\Theta(x_{i1})$ is the dependent variable estimation value, and $X_{i1}$ is the independent variable.

In an implementation, the first data provider device is provided with a parameter server and multiple working nodes.

In a second aspect, a method for training a model based on federated learning is provided according to an embodiment of the application. The method includes:

obtaining a second original independent variable calculated value according to a second model parameter and a second original independent variable of a second data provider device;

sending the second original independent variable calculated value to a first data provider device;

receiving, from the first data provider device, an encrypted difference between a dependent variable and a dependent variable estimation value; wherein the encrypted difference is obtained by the first data provider device encrypting a difference with a private key; the difference is calculated by the first data provider device according to the dependent variable of the first data provider device, a first independent variable calculated value of the first data provider device, and the second original independent variable calculated value;

calculating an encrypted gradient of a loss function with respect to the second model parameter, according to a public key sent by the first data provider device, the encrypted difference, the second original independent variable of the second data provider device, and a random number;

sending to the first data provider device the encrypted gradient of the loss function with respect to the second model parameter;

receiving, from the first data provider device, a sum of the random number and a gradient of the loss function with respect to the second model parameter, wherein the sum of the random number and the gradient of the loss function with respect to the second model parameter is obtained by the first data provider device decrypting the encrypted gradient of the loss function with respect to the second model parameter with the private key; and updating the second model parameter according to the gradient of the loss function with respect to the second model parameter.

In an implementation, the calculating an encrypted gradient of a loss function with respect to the second model parameter, according to a public key sent by the first data provider device, the encrypted difference, the second original independent variable of the second data provider device, and a random number includes:

calculating the encrypted gradient of the loss function with respect to the second model parameter by using the public key sent by the first data provider device and a following formula:

$$\left[\left[\frac{\partial L}{\partial \Theta^B}\right]\right] = -\frac{1}{n}\sum_{i=1}^{n}[[(y_i - h_\Theta(x_{i1}))]]x_i^B + [[R_B]];$$

where n is a number of the dependent variables, $y_i$ is a dependent variable, $x_i^B$ is a second original independent variable, $h_\Theta(x_{i1})$ is the dependent variable estimation value, $x_{i1}$ is a sum of independent variables, [[ ]] represents a homomorphism encryption.

In an implementation, the second data provider device is provided with a parameter server and multiple working nodes.

In a third aspect, a device for training a model based on federated learning is provided according an embodiment of the application. The device includes:

a second original independent variable calculated value receiving module, configured to receive a second original independent variable calculated value from a second data provider device; the second original independent variable calculated value being calculated by the second data provider device according to a second original independent variable and a second model parameter;

a dependent variable estimation value calculation module, configured to calculate a dependent variable estimation value according to a first model parameter initial value of a first provider device, a first original independent variable of the first data provider device, and the second original independent variable calculated value;

a difference calculation module, configured to calculate a difference between a dependent variable of the first data provider device and the dependent variable estimation value;

a first gradient calculation module, configured to calculate a gradient of a loss function with respect to a first model parameter, according to the difference; and a first model parameter updating module, configured to update the first model parameter according to the gradient of the loss function with respect to the first model parameter.

In an implementation, the device further includes:

a key module, configured to generate a pair of keys, and send a public key in the pair of keys to the second data provider device;

an encrypting module, configured to encrypt the difference by using a private key in the pair of keys to obtain an encrypted difference, and send the encrypted difference to the second data provider device;

an encrypted gradient receiving module, configured to receive an encrypted gradient of a loss function with respect to a second model parameter from the second data provider device, wherein the encrypted gradient of the loss function with respect to the second model parameter is obtained by the second data provider device performing a calculation on a random number and the encrypted difference with the public key;

a decrypting module, configured to decrypt, by using the private key in the pair of keys, the encrypted gradient of the loss function with respect to the second model parameter, to obtain a sum of the random number and the gradient of the loss function with respect to the second model parameter; and a decrypted value sending module, configured to send the sum of the random number and the gradient of the loss function with respect to the second model parameter to the second data provider device.

In an implementation, the dependent variable estimation value calculation module includes:

a first original independent variable calculation unit, configured to obtain a first original independent variable calculated value according to the first model parameter initial value of the first provider device and the first original independent variable of the first data provider device;

an independent variable calculation unit, configured to add the first original independent variable calculated value and the second original independent variable calculated value, to obtain an independent variable; and a dependent variable estimation value calculation unit, configured to obtain the dependent variable estimation value by calculating a sigmoid function value of the independent variable.

In an implementation, the first gradient calculation module is further configured to:

calculate the gradient of the loss function with respect to the first model parameter according to a following formula:

$$\frac{\partial L}{\partial \Theta^A} = -\frac{1}{n} \sum_{i=1}^{n} (y_i - h_\Theta(x_{i1})) x_i^A;$$

where n is a number of the dependent variables, $y_i$ is an original dependent variable, $x_i^A$ is a first original independent variable, $h_\Theta(x_{i1})$ is the dependent variable estimation value, and $x_{i1}$ is the independent variable.

In an implementation, the first data provider device is provided with a parameter server and multiple working nodes.

In a fourth aspect, a device for training a model based on federated learning is provided according to an embodiment of the present application. The device includes:

a second original independent variable calculation module, configured to obtain a second original independent variable calculated value according to a second model parameter and a second original independent variable of a second data provider device;

a second original independent variable calculated value sending module, configured to send the second original independent variable calculated value to a first data provider device;

an encrypted difference sending module, configured to receive, from the first data provider device, an encrypted difference between a dependent variable and a dependent variable estimation value; wherein the encrypted difference is obtained by the first data provider device encrypting a difference with a private key; the difference is calculated by the first data provider device according to the dependent variable of the first data provider device, a first independent variable calculated value of the first data provider device, and the second original independent variable calculated value;

an encrypted gradient calculation module, configured to calculate an encrypted gradient of a loss function with respect to the second model parameter, according to a public key sent by the first data provider device, an encrypted difference, the second original independent variable of the second data provider, and a random number;

an encrypted gradient sending module, configured to send to the first data provider device the encrypted gradient of the loss function with respect to the second model parameter;

a decrypted value receiving module, configured to receive, from the first data provider device, a sum of the random number and a gradient of the loss function with respect to the second model parameter, wherein the sum of the random number and the gradient of the loss function with respect to the second model parameter is obtained by the first data provider device decrypting the encrypted gradient of the loss function with respect to the second model parameter with the private key; and a second model parameter updating module, configured to update the second model parameter according to the gradient of the loss function with respect to the second model parameter.

In an implementation, the encrypted gradient calculation module is further configured to:

calculate the encrypted gradient of the loss function with respect to the second model parameter by using the public key sent by the first data provider device and a following formula:

$$\left[\!\left[\frac{\partial L}{\partial \Theta^B}\right]\!\right] = -\frac{1}{n} \sum_{i=1}^{n} [\![(y_i - h_\Theta(x_{i1}))]\!] x_i^B + [\![R_B]\!];$$

where n is a number of the dependent variables, $y_i$ is a dependent variable, $x_i^B$ is a second original independent variable, $h_\Theta(x_{i1})$ is the dependent variable estimation value, $x_{i1}$ is a sum of independent variables, $[\![\ ]\!]$ represents a homomorphism encryption.

In an implementation, the second data provider device is provided with a para server and multiple working nodes.

In a fifth aspect, an apparatus for training a model based on federated learning is provided according to an embodiment of the present application. The functions of the apparatus may be implemented by using hardware or by corresponding software executed by hardware. The hardware or software includes one or more modules corresponding to the functions described above.

In a possible embodiment, the apparatus structurally includes a processor and a storage, wherein the storage is configured to store a program which supports the apparatus in executing the above method for training a model. The processor is configured to execute the program stored in the storage. The apparatus may further include a communication interface through which the apparatus communicates with other devices or communication networks.

In a sixth aspect, a computer-readable storage medium for storing computer software instructions used for a device for training a model is provided. The computer readable storage medium may include programs involved in executing of the above described method for training a model.

One of the above technical solutions has the following advantages or beneficial effects: in embodiments of the present application, it is only necessary to exchange data between a first data provider device and a second data provider device. A first data provider has a first model parameter, a first original independent variable and a dependent variable, and a second data provider has a second model parameter and a second original independent variable. The first data provider and the second data provider do not know each other's data. When the first data provider updates the first model parameter, the second original independent variable of the second data provider needs to be used, and the value sent by the second data provider device to the first data provider device is a calculated value, which is calculated based on the second original independent variable and the second model parameter. The first data provider cannot retroactively calculate the second original independent variable and the second model parameter based on a second independent variable calculated value. Therefore, it is possible to ensure that without a third-party collaborator, the data sent by the second data provider device to the first data provider device is secured.

In embodiments of the present application, since the second original independent variable calculated value is obtained by a calculation based on the second original independent variable and the second model parameter of the second data provider, the first data provider cannot obtain the second original independent variable and the second model parameter according to the second original independent variable calculated value, without knowing the second original independent variable or the second model parameter in advance, thereby ensuring the security of the data of the second data provider. Further, the second data provider may perform a calculation on the data from the first data provider device by using a public key without knowing the original data of the first data provider, thereby ensuring the security of the original data of the first data provider. In an encrypted gradient of a loss function with respect to the second model parameter sent to the first data provider device, a random number is included, which is only known by the second data provider. Therefore, after decrypting the encrypted gradient of the loss function with respect to the second model parameter, the first data provider still cannot know the gradient of the loss function with respect to the second model parameter, thereby ensuring the security of the data of the second data provider.

The above summary is provided only for illustration and is not intended to be limiting in any way. In addition to the illustrative aspects, embodiments, and features described above, further aspects, embodiments, and features of the present application will be readily understood from the following detailed description with reference to the accompanying drawings.

BRIEF DESCRIPTION OF THE DRAWINGS

In the drawings, unless otherwise specified, identical or similar parts or elements are denoted by identical reference numerals throughout the drawings. The drawings are not necessarily drawn to scale. It should be understood these drawings merely illustrate some embodiments of the present application and should not be construed as limiting the scope of the present application.

DETAILED DESCRIPTION OF THE EMBODIMENTS

Hereafter, only certain exemplary embodiments are briefly described. As can be appreciated by those skilled in the art, the described embodiments may be modified in different ways, without departing from the spirit or scope of the present application. Accordingly, the drawings and the description should be considered as illustrative in nature instead of being restrictive.

Figure 1:
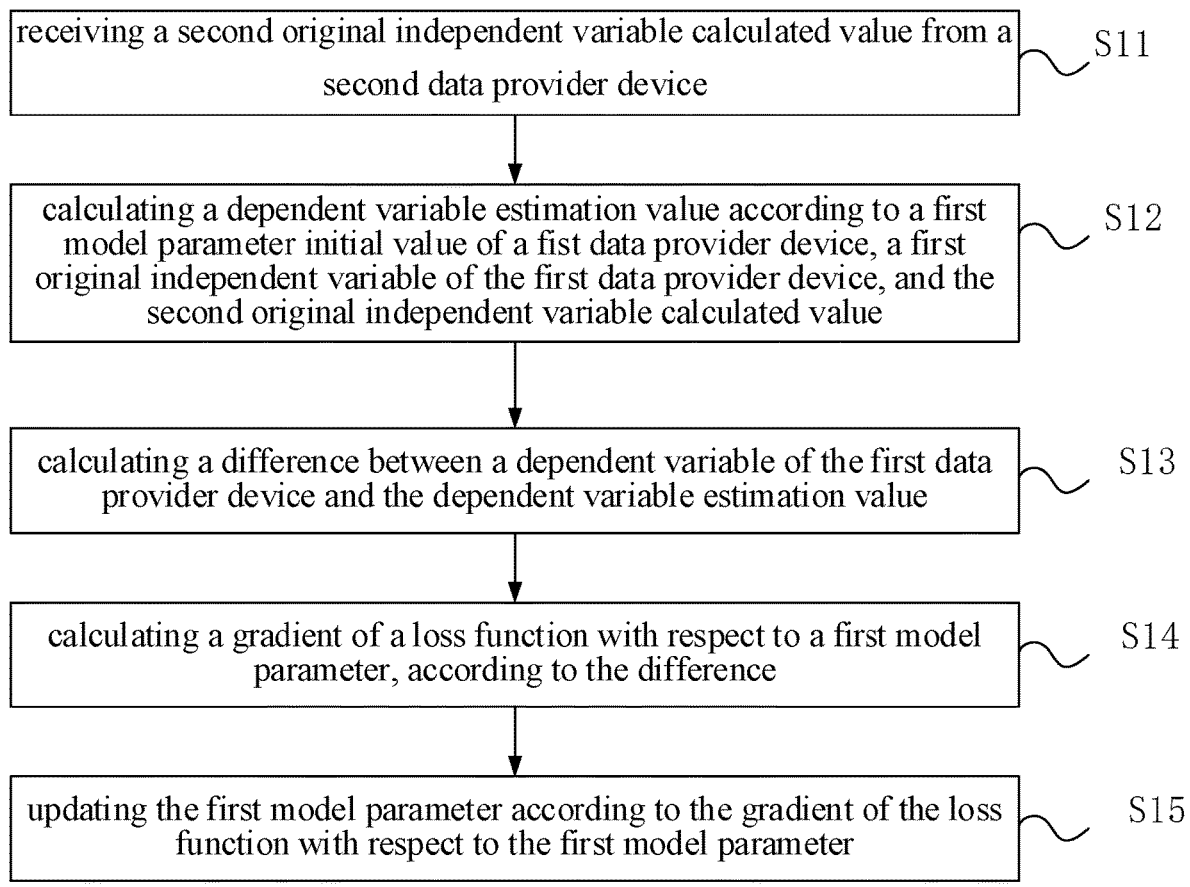
FIG. 1 is a flowchart showing a method for training a model based on federated learning according to an embodiment of the present application.

FIG. 1 is a flowchart showing a method for training a model based on federated learning according to an embodiment of the present application. As shown in FIG. 1, the method for training a mod& includes steps from S11 to S15.

At S11, a second original independent variable calculated value is received from a second data provider device. The second original independent variable calculated value is calculated by the second data provider device according to a second original independent variable and a second model parameter.

At S12, a dependent variable estimation value is calculated according to a first model parameter initial value of a first provider device, a first original independent variable of the first data provider device, and the second original independent variable calculated value.

At S13, a difference between a dependent variable of the first data provider device and the dependent variable estimation value is calculated.

At S14, a gradient of a loss function with respect to a first model parameter is calculated according to the difference.

At S15, the first model parameter is updated according to the gradient of the loss function with respect to the first model parameter.

In an embodiment of the present application, a first data provider device may be an information demander device. Information, which needs to be obtained from data included in the first data provider device itself and data included in a second data provider device, is a dependent variable. An independent variable and a dependent variable are included in original data of the first data provider device. An independent variable is included in original data of the second data provider device. Further, the independent variable of the first data provider device and the independent variable of the second data provider device have a certain association with original dependent variables. A first independent variable is calculated according to the independent variable provided by the first data provider device, and a second independent variable is calculated according to the independent variable provided by the second data provider device. In the case that the first independent variable and the second independent variable are known, an estimated dependent variable may be obtained. The estimated dependent variable is close to the dependent variable to a considerable extent.

For example, a financial company A is a first data provider and a network company B is a second data provider. The financial company A needs to know a repayment possibility of a new borrower. General information of multiple borrowers, such as gender and age, and repayment status, are recorded in original data of a first data provider device. In original data of a second data provider device, information about the multiple borrowers recorded in the original data of the first data provider device, such as their searching records for loan information on a webpage, their registration time, which is the time they registered to use an online product, are included. According to the original data provided by these two data provider devices, such as the general information and the searching records of the borrowers, a relationship between the independent variables and the dependent variable of the repayment status may be obtained. Using original data training models provided by the first data provider device and the second data provider device, it is possible to predict a repayment possibility of a new borrower based on the independent variables, such as the general information and the searching records on webpages of the new borrower.

In embodiments of the present application, it is only necessary to exchange data between a first data provider device and a second data provider device. A first data provider has a first model parameter, a first original independent variable and a dependent variable, and a second data provider has a second model parameter and a second original independent variable. The first data provider and the second data provider do not know each other's data. When the first data provider updates the first model parameter, the second original independent variable of the second data provider needs to be used, and the value sent by the second data provider device to the first data provider device is a calculated value, which is calculated based on the second original independent variable and the second model parameter. The first data provider cannot retroactively calculate the second original independent variable and the second model parameter based on a second independent variable calculated value. Therefore, it is possible to ensure that without a third-party collaborator, the data sent by the second data provider device to the first data provider device is secure.

In an implementation, before the receiving a second original independent variable calculated value from the second data provider device, the method further includes:
generating a pair of keys, and sending a public key in the pair of keys to the second data provider device;
after the calculating a difference between a dependent variable of the first data provider device and the dependent variable estimation value, the method further includes:
encrypting the difference by using a private key in the pair of keys to obtain an encrypted difference, and sending the encrypted difference to the second data provider device;
receiving an encrypted gradient of a loss function with respect to a second model parameter from the second data provider device, wherein the encrypted gradient of the loss function with respect to the second model parameter is obtained by the second data provider device performing a calculation on a random number and the encrypted difference with the public key;
decrypting, by using the private key in the pair of keys, the encrypted gradient of the loss function with respect to the second model parameter, to obtain a sum of the random number and the gradient of the loss function with respect to the second model parameter; and
sending the sum of the random number and the gradient of the loss function with respect to the second model parameter to the second data provider device.

In an embodiment of the present application, a difference between the dependent variable and the dependent variable estimation value, which includes the dependent variable, needs to be sent by the first data provider device to the second data provider device. In order to ensure the security of the original data from the first data provider device, the data sent by the first data provider device to the second data provider device is encrypted by using a key. The key is held by a party who generates the key, and the key includes a private key and a public key. The private key may be used to encrypt the data, and the public key may be used to calculate the data encrypted by the private key. Therefore, according to an embodiment of the present application, it may be ensured that the difference is encrypted, and the public key is sent to the second data provider device. Further, it is ensured that the second data provider device may perform a calculation on the data from the first data provider device, without knowing the original data of the first data provider device, thereby ensuring that the safety of the first original independent variable and the dependent variable of the first data provider device.

In an implementation, the calculating a dependent variable estimation value according to a first model parameter initial value of a first provider device, a first original independent variable of the first data provider device, and the second original independent variable calculated value includes:
obtaining a first original independent variable calculated value according to the first model parameter initial value of the first provider device and the first original independent variable of the first data provider device;
adding the first original independent variable calculated value and the second original independent variable calculated value, to obtain an independent variable; and
obtaining the dependent variable estimation value by calculating a sigmoid function value of the independent variable. The sigmoid function is a common S-shaped function in biology, also known as S-shaped growth curve. The sigmoid function may map a real number to an interval of (0, 1), and may also be used for binary classification. The sigmoid function has advantages of smoothness and simple differentiation.

In an embodiment of the present application, it is assumed that a sum of the independent variables is $\Theta x$, and the estimation function is $$h_\Theta(x) = \frac{1}{1+e^{-\Theta x}},$$

where e is a natural constant.

In a specific embodiment of the present application, a calculation formula of the first original independent variable calculated value is $\Theta^A x_i^A$, where $\Theta^A$ is a first model parameter, and $x_i^A$ is a first original independent variable. A calculation formula of the second original independent variable calculated value is $\Theta^B x_i^B$, where $\Theta^B$ is a second model parameter, and $x_i^B$ is a second original independent variable.

According to the calculation manner of the above embodiment, the sum of the independent variables is $\Theta^A x_i^A + \Theta^B x_i^B$.

In an implementation, the calculating a gradient of a loss function with respect to a first model parameter, according to the difference includes:
calculating the gradient of the loss function with respect to the first model parameter according to a following formula:

$$\frac{\partial L}{\partial \Theta^A} = -\frac{1}{n}\sum_{i=1}^{n}(y_i - h_\Theta(x_{i1}))x_i^A;$$

where n is a number of dependent variables, is an original dependent variable, $x_i^A$ is a first original independent variable, $h_\Theta(x_{i1})$ is the dependent variable estimation value, and $x_{i1}$ is the independent variable.

In an implementation, the first data provider device is provided with a parameter server and multiple working nodes.

In an embodiment of the present application, the more working nodes are provided in the data provider device, the less time it takes to perform each round of training. In embodiments of the present application, an implementation framework of a distributed federated learning is provided. A model is trained based on original data of a first data provider device and original data of a second data provider device. In a case where the original data is kept local to a data provider device, a Logistic Regression (LR) model may be generated. Through the model, commercial value of the data may be realized.

Figure 2:
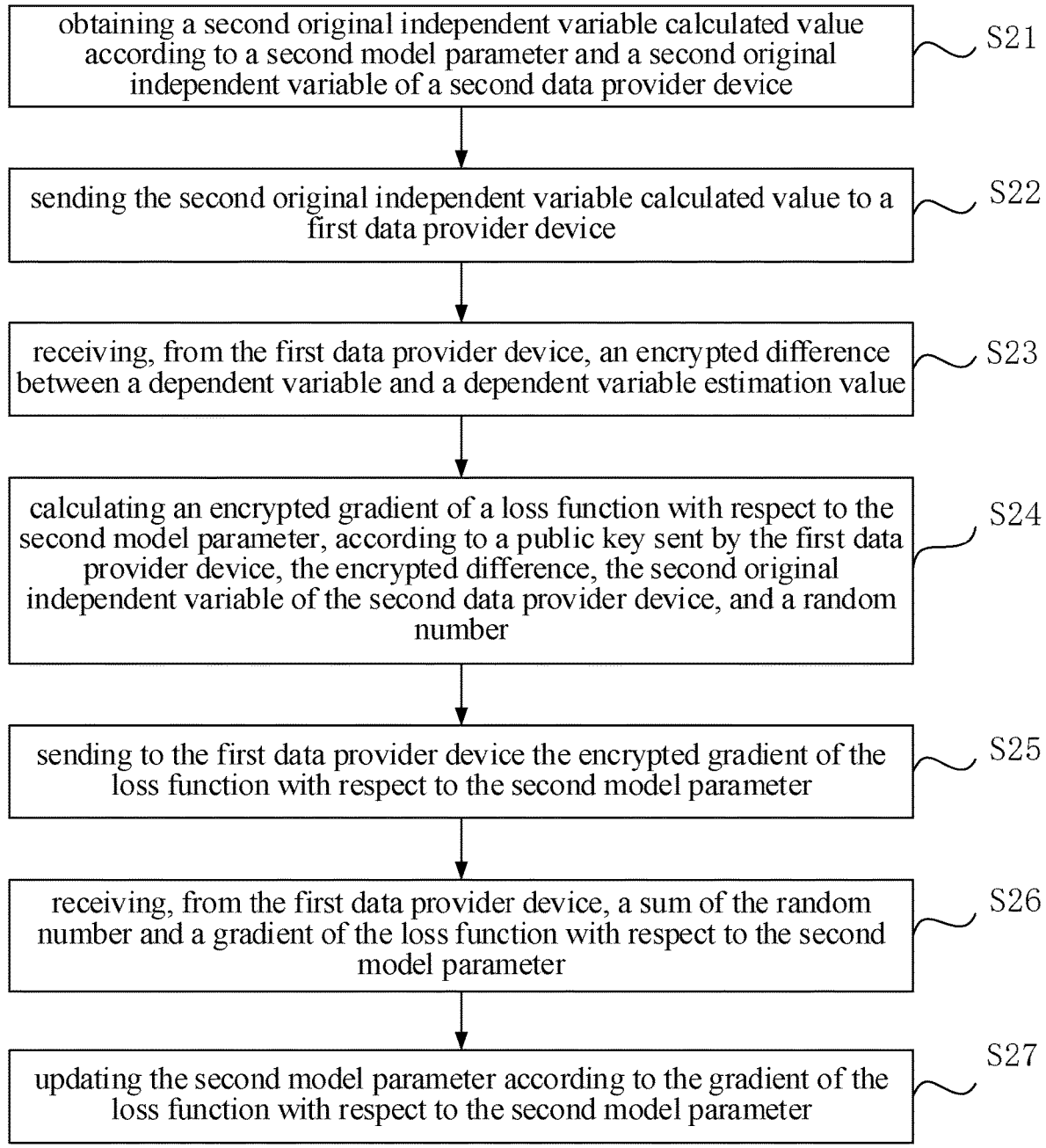
FIG. 2 is a flowchart showing a method for training a model based on federated learning according to an embodiment of the present application.

According to an embodiment of the present application, a method for training a model based on federated learning is further provided. As shown in FIG. 2, the method includes steps from S21 to S27.

At S21, a second original independent variable calculated value is obtained according to a second model parameter and a second original independent variable of a second data provider device.

At S22, the second original independent variable calculated value is sent to a first data provider device.

At S23, an encrypted difference between a dependent variable and a dependent variable estimation value is received from the first data provider device; wherein the encrypted difference is obtained by the first data provider device encrypting a difference with a private key; the difference is calculated by the first data provider device according to the dependent variable of the first data provider device, a first independent variable calculated value of the first data provider device, and the second original independent variable calculated value.

At S24, an encrypted gradient of a loss function with respect to the second model parameter is calculated, according to a public key sent by the first data provider device, the encrypted difference, the second original independent variable of the second data provider device, and a random number.

At S25, the encrypted gradient of the loss function with respect to the second model parameter is sent to the first data provider device.

At S26, a sum of the random number and a gradient of the loss function with respect to the second model parameter is received from the first data provider device, wherein the sum of the random number and the gradient of the loss function with respect to the second model parameter is obtained by the first data provider device decrypting the encrypted gradient of the loss function with respect to the second model parameter with the private key.

At S27, the second model parameter is updated according to the gradient of the loss function with respect to the second model parameter.

In an embodiment of the present application, since the second original independent variable calculated value is obtained by a calculation based on the second original independent variable and the second model parameter of the second data provider, the first data provider cannot obtain the second original independent variable and the second model parameter according to the second original independent variable calculated value, without knowing the second original independent variable or the second model parameter in advance, thereby ensuring the security of the data of the second data provider. Further, the second data provider may perform a calculation on the data from the first data provider device by using a public key without knowing the original data of the first data provider, thereby ensuring the security of the original data of the first data provider. In an encrypted gradient of a loss function with respect to the second model parameter sent to the first data provider device, a random number is included, which is only known by the second data provider. Therefore, after decrypting the encrypted gradient of the loss function with respect to the second model parameter, the first data provider still cannot know the gradient of the loss function with respect to the second model parameter, thereby ensuring the security of the data of the second data provider.

In an embodiment of the present application, two sub-models may be trained at the first data provider device and the second data provider device, respectively. In a prediction stage, prediction results are obtained by using the two sub-models, and then the obtained prediction results are integrated into one prediction result.

In an implementation, the calculating an encrypted gradient of a loss function with respect to the second model parameter, according to a public key sent by the first data provider device, the encrypted difference, the second original independent variable of the second data provider device, and a random number includes:

calculating the encrypted gradient of the loss function with respect to the second model parameter by using the public key sent by the first data provider device and a following formula:

$$\left[\!\left[\frac{\partial L}{\partial \Theta^B}\right]\!\right] = -\frac{1}{n}\sum_{i=1}^{n}\left[\!\left[(y_i - h_\Theta(x_{i1}))\right]\!\right]x_i^B + [\![R_B]\!];$$

where n is a number of dependent variables, $y_i$ is a dependent variable, $x_i^B$ is a second original independent variable, $h_\Theta(x_{i1})$ is the dependent variable estimation value, $x_{i1}$ is a sum of independent variables, [[ ]] represents a homomorphism encryption.

In an implementation, the second data provider device is provided with a parameter server and multiple working nodes.

According to embodiments of the present application, information required by a data demander device may be estimated based on original data provided by a first data provider device and original data provided by a second data provider device. Then, based on a difference between an estimated result and an actual original dependent variable, corresponding gradient of a loss function is calculated, and a model parameter is updated based on the gradient, that is, the model parameter is updated based on the difference between the estimated result and the actual original dependent variable. Therefore, after the model is trained, a calculated estimation function value is much closer to the actual original dependent variable. By using the model trained by the method for training a model provided according to embodiments of the present application, a dependent variable may be estimated according to a known independent variable, thereby providing required information for a data demander device. In federated learning technology, it is possible to realize a data sharing between a data provider device and a data demander device without a third-party collaborator, while the privacy of data is ensured.

Figure 3:
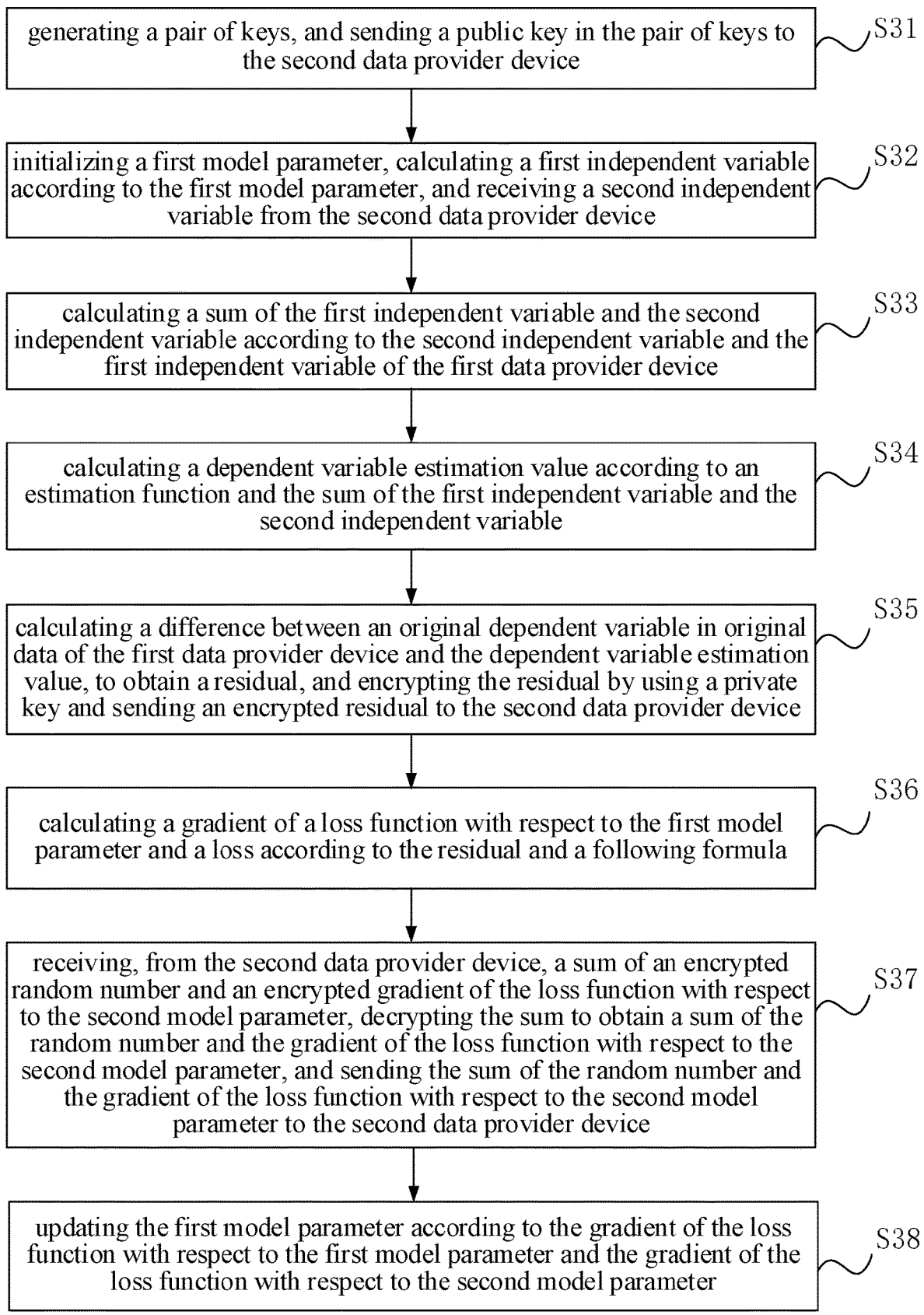
FIG. 3 is a flowchart showing a method for training a model based on federated learning according to an embodiment of the present application.

In an example of the present application, by using the method for training a model provided according to an embodiment of the present application, a model training is performed on both sides of a first data provider device and a second data provider device. A method for training a model performed on the first data provider device includes followings steps shown in FIG. 3.

At S31, a pair of keys are generated and a public key in the pair of keys (that is, a public key) is sent to the second data provider device.

At S32, a first model parameter is initialized, a first independent variable $\Theta^A x_i^A$ is calculated according to the first model parameter, and a second independent variable $\Theta^B x_i^B$ is received from the second data provider device.

At S33, a sum of the first independent variable and the second independent variable $\Theta^A x_i^A + \Theta^B x_i^B$ according to the second independent variable and the first independent variable $\Theta^A x_i^A$ of the first data provider device.

At S34, a dependent variable estimation value $\hat{y}_i$ is calculated according to an estimation function and the sum of the first independent variable and the second independent variable.

At S35, a difference between an original dependent variable in original data of the first data provider device and the dependent variable estimation value, to obtain a residual, the residual is encrypted by using a private key, and an encrypted residual $[\![(y_i - \hat{y}_i)]\!]$ is sent to the second data provider device.

At S36, a gradient $$\frac{\partial L}{\partial \Theta^A}$$

of a loss function with respect to the first model parameter and a loss L is calculated according to the residual and a following formula:

$$\frac{\partial L}{\partial \Theta^A} = -\frac{1}{n}\sum_{i=1}^{n}(y_i - h_\Theta(x_{i1}))x_i^A;$$

where n is a number of dependent variables, $y_i$ is an original dependent variable, $x_i^A$ is a first original independent variable, $h_\Theta(x_{i1})$ is the dependent variable estimation value, and $x_{i1}$ is the sum of the first independent variable and the second independent variable.

At S37, a sum of an encrypted gradient $$\left[\!\left[\frac{\partial L}{\partial \Theta^B}\right]\!\right]$$

of the loss function with respect to the second model parameter and an encrypted random number $[\![R_B]\!]$ is received from the second data provider device, the sum is decrypted to obtain a sum $$\frac{\partial L}{\partial \Theta^B} + R_B$$

of the gradient $$\frac{\partial L}{\partial \Theta^A}$$

of the loss function with respect to the second model parameter and the random number, and the sum $$\frac{\partial L}{\partial \Theta^B} + R_B$$

is sent to the second data provider device.

At S38, the first model parameter is updated according to the gradient of the loss function with respect to the first model parameter and the gradient of the loss function with respect to the second model parameter.

In an embodiment of the present application, according to records in original data, an original dependent variable value may be 0 or 1, indicating no or yes. For example, it is indicated whether a borrower will repay. A dependent variable estimation value is a repayment probability of a borrower predicted based on the original data. In a case where the dependent variable estimation value is close to the original dependent variable, it indicates that the prediction accuracy of the model is high.

Figure 4:
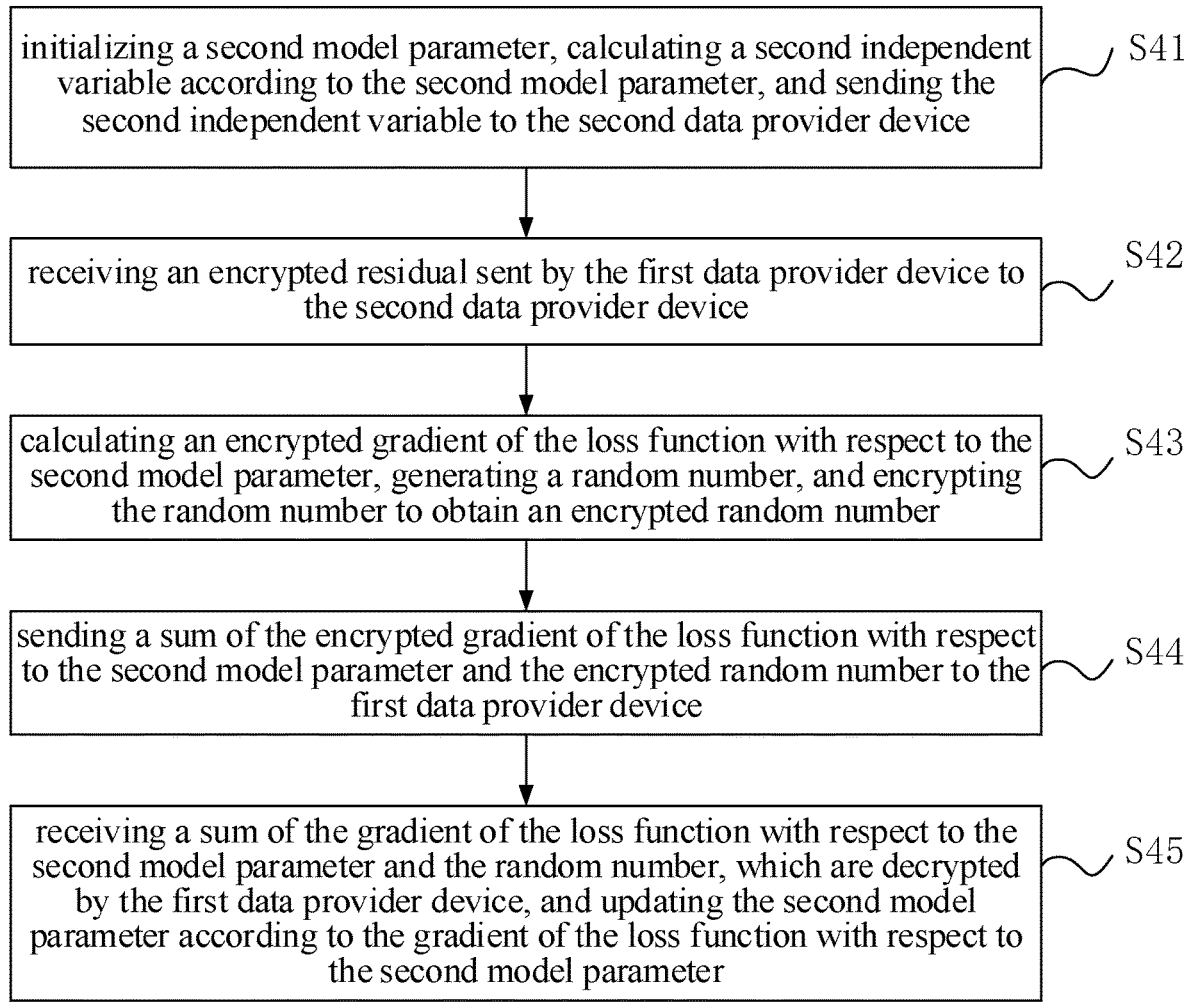
FIG. 4 is a flowchart showing a method for training a model based on federated learning according to an embodiment of the present application.

A method for training a model performed on the second data provider device includes following steps from S41 to S45, as shown in FIG. 4.

At S41, a second model parameter is initialized, a second independent variable $\Theta^B x_i^B$ is calculated according to the second model parameter, and the second independent variable is sent to the second data provider device.

At S42, an encrypted residual sent by the first data provider device to the second data provider device is received.

At S43, an encrypted gradient $$\left[\!\left[\frac{\partial L}{\partial \Theta^B}\right]\!\right]$$

of the loss function with respect to the second model parameter is calculated, a random number $R_B$ is generated, and the random number is encrypted to obtain an encrypted random number $[\![R_B]\!]$ according to the encrypted residual and a following formula:

$$\frac{\partial L}{\partial \Theta^B} = \left[\!\left[-\frac{1}{n}\sum_{i=1}^{n}(y_i - h_\Theta(x_{i1}))x_i^B\right]\!\right];$$

where n is a number of dependent variables, $y_i$ is a dependent variable, $x_i^B$ is a second original independent variable, $h_\Theta(x_{i1})$ is the dependent variable estimation value, $x_{i1}$ is a sum of the independent variables.

At S44: a sum of the encrypted gradient $$\left[\!\left[\frac{\partial L}{\partial \Theta^B}\right]\!\right]$$

of the loss function with respect to the second model parameter and the encrypted random number $[\![R_B]\!]$ is sent to the first data provider device.

At S45: a sum $$\frac{\partial L}{\partial \Theta^B} + R_B$$

of the gradient of the loss function with respect to the second model parameter and the random number, which are decrypted by the first data provider device, is received, and the second model parameter is updated according to the gradient of the loss function with respect to the second model parameter.

In an embodiment of the present application, ⟦ ⟧ represents a homomorphic encryption, and encrypted data cannot be retroactively deciphered without a private key.

As a pair of keys is generated at the first data provider device, the second data provider does not know the private key and cannot decrypt the data, which is encrypted by the first data provider device with a private key. However, the second data provider device may perform a calculation on the encrypted data sent by the first data provider device by using a public key sent by the first data provider device, and a calculation result is still encrypted data, which may be further sent to the first data provider device for decryption.

Figure 5:
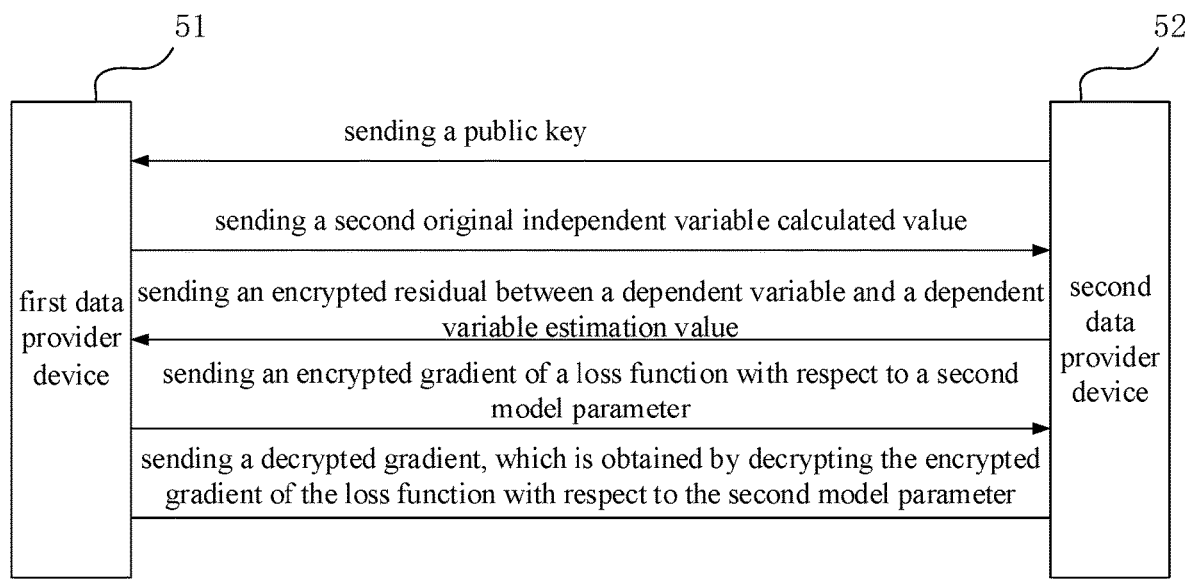
FIG. 5 is a diagram showing a data transmission during a process for training a model according to an embodiment of the present application.

FIG. 5 is a schematic diagram showing a data transmission process between a first data provider device and a second data provider device according to an embodiment of the present application. The data transmission process includes:

the first data provider device 51 sends a public key to the second data provider device 52;

the second data provider device 52 calculates a second original independent variable calculated value and sends it to the first data provider device 51;

the first data provider device 51 sends an encrypted residual between a dependent variable and a dependent variable estimation value to the second data provider device 52;

the second data provider device 52 sends an encrypted gradient of a loss function with respect to a second model parameter to the first data provider device 51; and the first data provider device 51 sends a decrypted gradient, which is obtained by decrypting the encrypted gradient of the loss function with to the second model parameter, to the second data provider device 52.

In an example of the present application, a model based on federated learning may include two sub-models, that is, a first sub-model and a second sub-model. The first sub-model may be trained at the first data provider device, and the second sub-model may be trained at the second data provider device. When using the models to predict a dependent variable, both of the first sub-model and the second sub-model may be used to provide prediction results. A final prediction result is obtained by combining the prediction results of the two sub-models.

The Mnist handwritten digit recognition public dataset and the Citeseer scientific index public dataset are used to test a model trained based on the federated learning according to an embodiment of the present application. The data of the dataset are shown in Table 1.

TABLE 1

| Dataset | Line | Row | Dataset feature type |
|---------|------|-----|----------------------|
| Mnist | 60000 | 784 | continuous |
| Citeseer | 181395 | 105354 | discrete |

Table 2 shows the Area Under Curve (AUC, area enclosed by (and under) a ROC curve and a coordinate axis) values for testing a model provided by an embodiment of the present application using the two public datasets in Table 1. According to Table 2, it may be known that AUC indexes of a training set and AUC indexes of a test set of the model trained according to the embodiment of the present application are close to 1, indicating that the model trained by the method provided according to the embodiment of the present application has better results. The test set is a dataset of a test model, and the training set is a dataset of a training model.

TABLE 2

| | AUC of a training feature set | AUC of a test feature set |
|---|---|---|
| Mnist | 0.95 | 0.99 |
| Citeseer | 0.99 | 0.89 |

The function of each module in each device in embodiments of the present application can refer to the corresponding description in the foregoing methods, which will not be described herein again.

Figure 6:
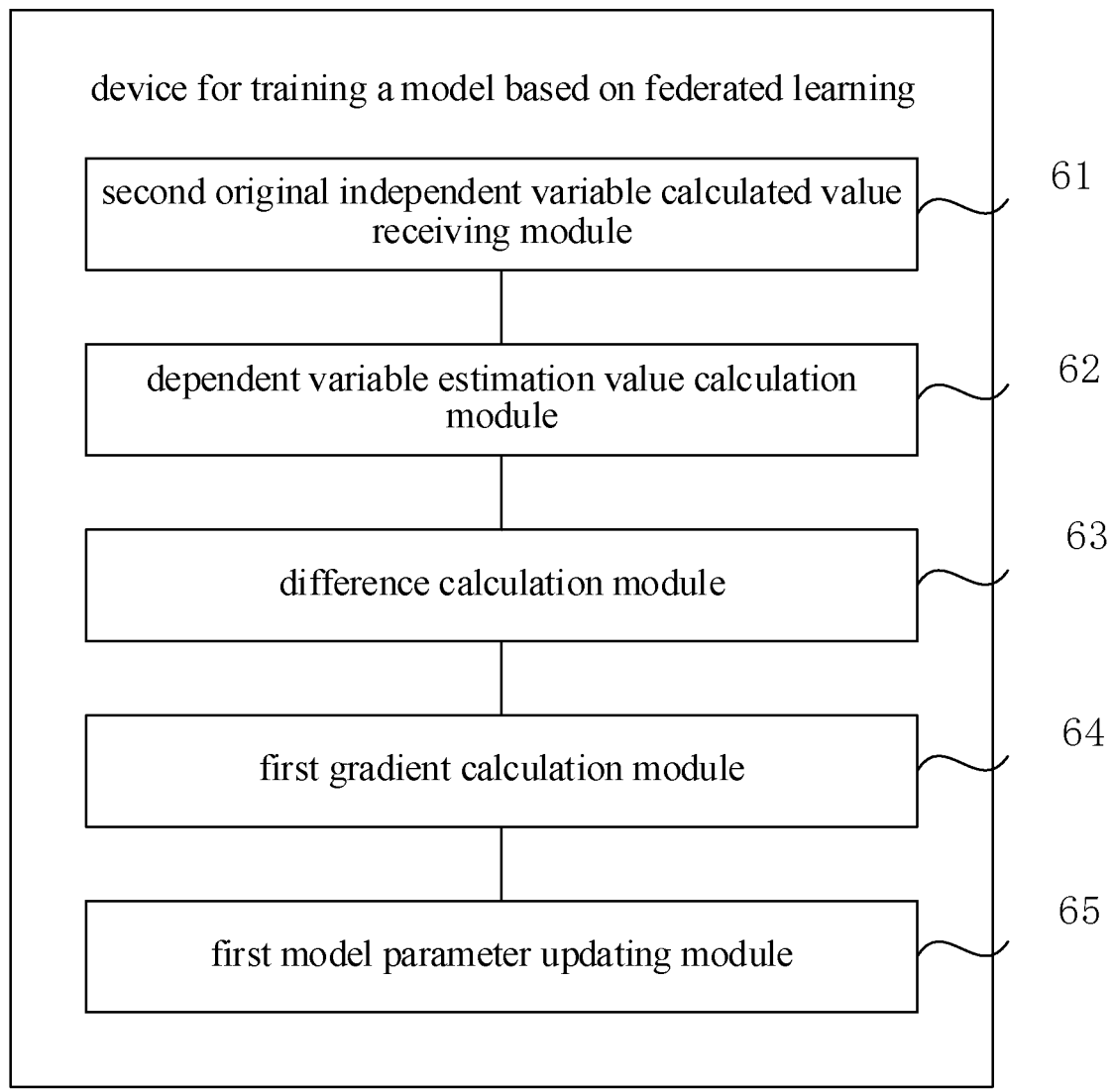
FIG. 6 is a structural block diagram showing a device for training a model based on federated learning according to an embodiment of the present application.

A device for training a model based on federated learning is further provided according to an embodiment of the application. As shown in FIG. 6, the device includes:

a second original independent variable calculated value receiving module 61, configured to receive a second original independent variable calculated value from a second data provider device; the second original independent variable calculated value being calculated by the second data provider device according to a second original independent variable and a second model parameter;

a dependent variable estimation value calculation module 62, configured to calculate a dependent variable estimation value according to a first model parameter initial value of the first provider device, a first original independent variable of the first data provider device, and the second original independent variable calculated value;

a difference calculation module 63, configured to calculate a difference between a dependent variable of the first data provider device and the dependent variable estimation value;

a first gradient calculation module 64, configured to calculate a gradient of a loss function with respect to a first model parameter, according to the difference; and a first model parameter updating module 65, configured to update the first model parameter according to the gradient of the loss function with respect to the first model parameter.

In an implementation, the device further includes:

a key module, configured to generate a pair of keys, and send a public key in the pair of keys to the second data provider device;

an encrypting module, configured to encrypt the difference by using a private key in the pair of keys to obtain an encrypted difference, and send the encrypted difference to the second data provider device;

an encrypted gradient receiving module, configured to receive an encrypted gradient of a loss function with respect to a second model parameter from the second data provider device, wherein the encrypted gradient of the loss function with respect to the second model parameter is obtained by the second data provider device performing a calculation on a random number and the encrypted difference with the public key;

a decrypting module, configured to decrypt, by using the private key in the pair of keys, the encrypted gradient of the loss function with respect to the second model parameter, to obtain a sum of the random number and the gradient of the loss function with respect to the second model parameter; and a decrypted value sending module, configured to send the sum of the random number and the gradient of the loss function with respect to the second model parameter to the second data provider device.

In an implementation, the dependent variable estimation value calculation module includes:

a first original independent variable calculation unit, configured to obtain a first original independent variable calculated value according to the first model parameter initial value of the first provider device and the first original independent variable of the first data provider device;

an independent variable calculation unit, configured to add the first original independent variable calculated value and the second original independent variable calculated value, to obtain an independent variable; and a dependent variable estimation value calculation unit, configured to obtain the dependent variable estimation value by calculating a sigmoid function value of the independent variable.

In an implementation, the first gradient calculation module is further configured to:

calculate the gradient of the loss function with respect to the first model parameter according to a following formula:

$$\frac{\partial L}{\partial \Theta^A} = -\frac{1}{n}\sum_{i=1}^{n}(y_i - h_\Theta(x_{i1}))x_i^A;$$

where n is a number of the dependent variables, $y_i$ is an original dependent variable, $x_i^A$ is a first original independent variable, $h_\Theta(x_{i1})$ is the dependent variable estimation value, and $x_{i1}$ is the independent variable.

In an implementation, the first data provider device is provided with a parameter server and multiple working nodes.

Figure 7:
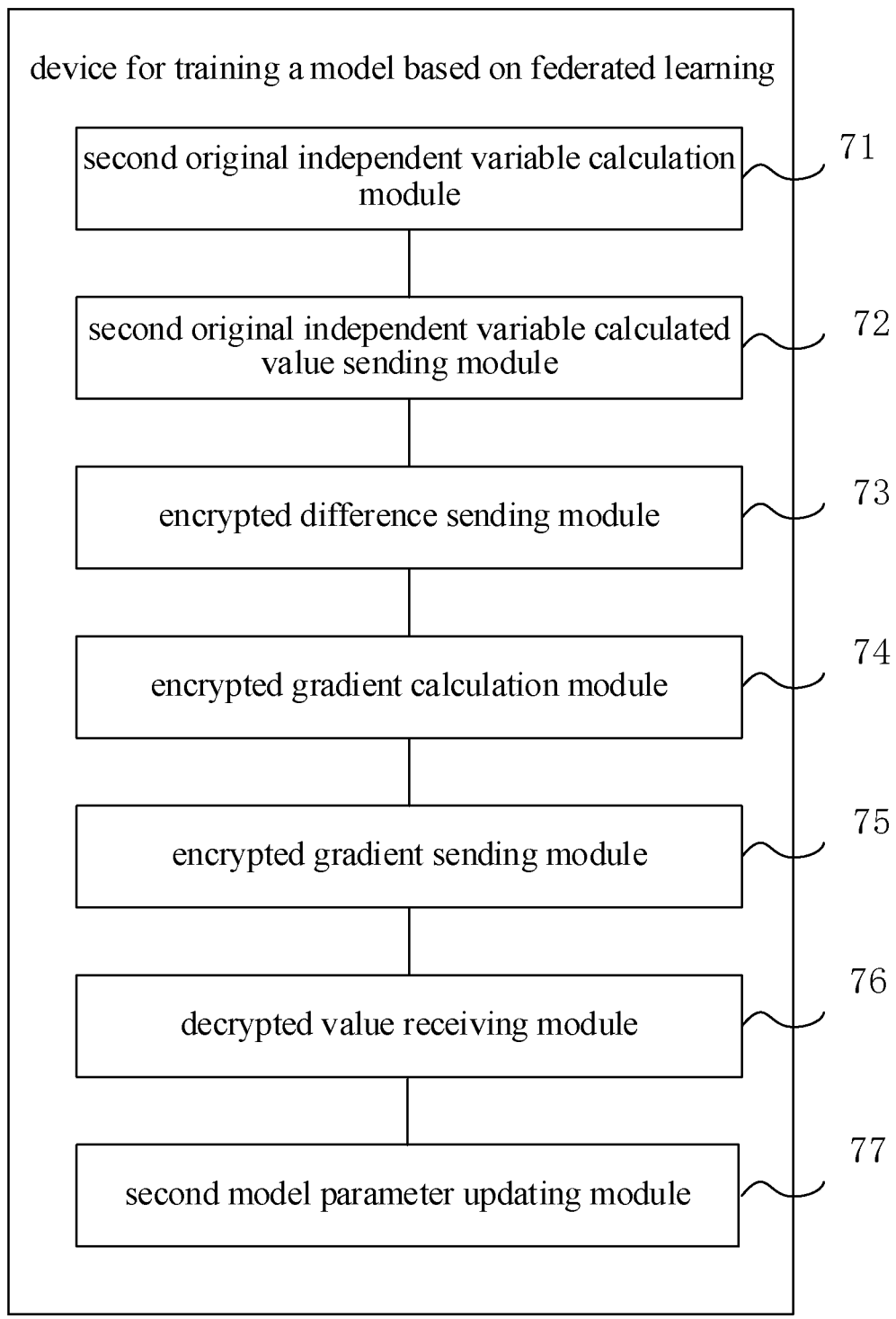
FIG. 7 is a structural block diagram showing a device for training a model based on federated learning according to an embodiment of the present application.

A device for training a model based on federated learning is further provided according to an embodiment of the application. As shown in FIG. 7, the device includes:

a second original independent variable calculation module 71, configured to obtain a second original independent variable calculated value according to a second model parameter and a second original independent variable of a second data provider device;

a second original independent variable calculated value sending module 72, configured to send the second original independent variable calculated value to a first data provider device;

an encrypted difference sending module 73, configured to receive, from the first data provider device, an encrypted difference between a dependent variable and a dependent variable estimation value; wherein the encrypted difference is obtained by the first data provider device encrypting a difference with a private key; the difference is calculated by the first data provider device according to the dependent variable of the first data provider device, a first independent variable calculated value of the first data provider device, and the second original independent variable calculated value;

an encrypted gradient calculation module 74, configured to calculate an encrypted gradient of a loss function with respect to the second model parameter, according to a public key sent by the first data provider device, an encrypted difference, the second original independent variable of the second data provider, and a random number;

an encrypted gradient sending module 75, configured to send to the first data provider device the encrypted gradient of the loss function with respect to the second model parameter;

a decrypted value receiving module 76, configured to receive, from the first data provider device, a sum of the random number and a gradient of the loss function with respect to the second model parameter, wherein the sum of the random number and the gradient of the loss function with respect to the second model parameter is obtained by the first data provider device decrypting the encrypted gradient of the loss function with respect to the second model parameter with the private key; and a second model parameter updating module 77, configured to update the second model parameter according to the gradient of the loss function with respect to the second model parameter.

In an implementation, the encrypted gradient calculation module is further configured to:

calculate the encrypted gradient of the loss function with respect to the second model parameter by using the public key sent by the first data provider device and a following formula:

$$\left[\!\left[\frac{\partial L}{\partial \Theta^B}\right]\!\right] = -\frac{1}{n}\sum_{i=1}^{n}[[(y_i - h_\Theta(x_{i1}))]]x_i^B [\![R_B]\!]$$

where n is a number of the dependent variables, $y_i$ is the dependent variable, $x_i^B$ is a second original independent variable, $h_\Theta(x_{i1})$ is the dependent variable estimation value, $x_{i1}$ is a sum of independent variables, [[ ]] represents a homomorphism encryption.

In an implementation, the second data provider device is provided with a parameter server and multiple working nodes.

Figure 8:
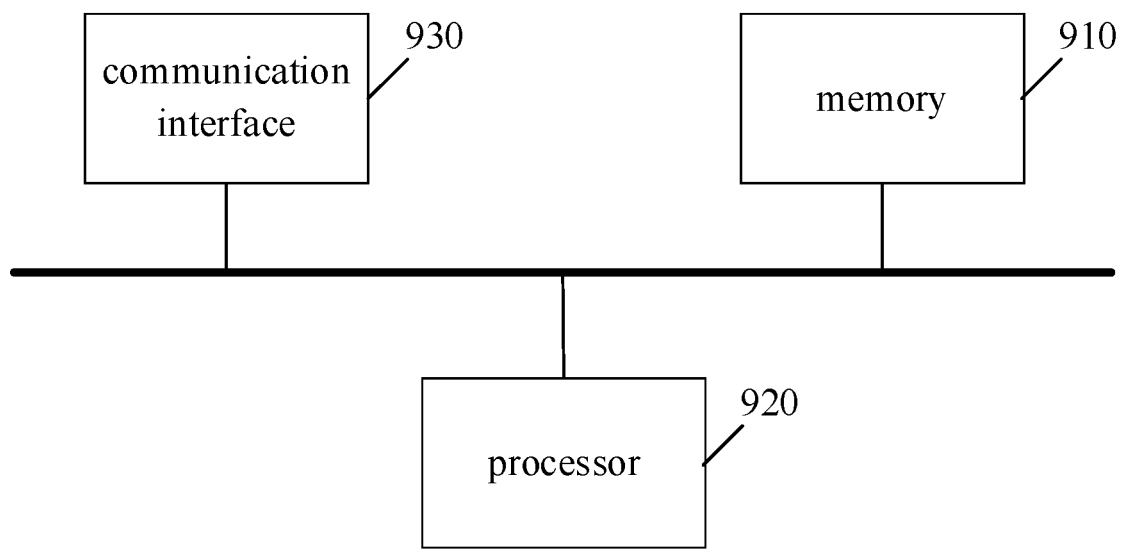
FIG. 8 is a structural block diagram showing an apparatus for training a model based on federated learning according to an embodiment of the present application.

FIG. 8 is a structural block diagram showing an apparatus according to an embodiment of the present application. As shown in FIG. 8, the device/apparatus/terminal/server includes a memory 910 and a processor 920, wherein a computer program that can run on the processor 920 is stored in the memory 910. The processor 920 executes the computer program to implement the method for training a model based on federated learning in the abovementioned embodiment. The number of either the memory 910 or the processor 920 may be one or more.

The device/apparatus/terminal/server further includes:

a communication interface 930 configured to communicate with an external device and exchange data.

The memory 910 may include a high-speed RAM memory and may also include a non-volatile memory, such as at least one magnetic disk memory.

If the memory 910, the processor 920, and the communication interface 930 are implemented independently, the memory 910, the processor 920, and the communication interface 930 may be connected to each other through a bus to realize mutual communication. The bus may be an Industry Standard Architecture (ISA) bus, a Peripheral Component (PCI) bus, an Extended. Industry Standard Component (EISA) bus, or the like. The bus may be divided into an address bus, a data bus, a control bus, and the like. For ease of illustration, only one bold line is shown in FIG. 8 to represent the bus, but it does not mean that there is only one bus or one type of bus.

Optionally, in a specific implementation, if the memory 910, the processor 920, and the communication interface 930 are integrated on one chip, the memory 910, the processor 920, and the communication interface 930 may implement mutual communication through an internal interface.

According to an embodiment of the application, it is provided a computer-readable storage medium having computer programs stored thereon. When executed by a processor, the programs implement the method described in the above embodiment.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. The computer readable medium of the embodiments of the present application may be a computer readable signal medium or a computer readable storage medium or any combination of the above. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A method for training a model based on federated learning, executed by a first data provider device, comprising:
    receiving, from a second data provider device, a second original independent variable calculated value, the second original independent variable calculated value being calculated by the second data provider device according to a second original independent variable and a second model parameter;
    calculating a dependent variable estimation value according to:

a first model parameter initial value of the first data provider device,
a first original independent variable of the first data provider device, and
the second original independent variable calculated value;
calculating a difference between a dependent variable of the first data provider device and the dependent variable estimation value;
calculating a gradient of a loss function with respect to a first model parameter, according to the difference; and
updating the first model parameter according to the gradient of the loss function with respect to the first model parameter,
wherein each of the second original independent variable calculated value, the dependent variable estimation value, the difference between the dependent variable of the first data provider device and the dependent variable estimation value, and the gradient of the loss function with respect to the first model parameter is not encrypted data,
and wherein the method further comprises:
prior to the receiving the second original independent variable calculated value from the second data provider device:
generating a pair of keys; and
sending, to the second data provider device, a public key in the pair of keys; and
after the calculating the difference between the dependent variable of the first data provider device and the dependent variable estimation value:
encrypting the difference by using a private key in the pair of keys to obtain an encrypted difference, and sending the encrypted difference to the second data provider device;
receiving an encrypted gradient of a loss function with respect to a second model parameter from the second data provider device, wherein the encrypted gradient of the loss function with respect to the second model parameter is obtained by the second data provider device performing a calculation on a random number and the encrypted difference with the public key;
decrypting, by using the private key in the pair of keys, the encrypted gradient of the loss function with respect to the second model parameter, to obtain a sum of the random number and the gradient of the loss function with respect to the second model parameter; and
sending the sum of the random number and the gradient of the loss function with respect to the second model parameter to the second data provider device.

2. The method according to claim 1, wherein the calculating the dependent variable estimation value according to the first model parameter initial value of the first data provider device, the first original independent variable of the first data provider device, and the second original independent variable calculated value comprises:
obtaining a first original independent variable calculated value according to the first model parameter initial value of the first data provider device and the first original independent variable of the first data provider device;
adding the first original independent variable calculated value and the second original independent variable calculated value, to obtain an independent variable; and
obtaining the dependent variable estimation value by calculating a sigmoid function value of the independent variable.

3. The method according to claim 2, wherein the calculating the gradient of the loss function with respect to the first model parameter, according to the difference comprises:
calculating the gradient of the loss function with respect to the first model parameter according to a following formula:

$$\frac{\partial L}{\partial \Theta^A} = -\frac{1}{n}\sum_{i=1}^{n}(y_i - h_\Theta(x_{i1}))x_i^A;$$

wherein n is a number of dependent variables, $y_i$ is an original dependent variable, $x_i^A$ is the first original independent variable, A stands for the first data provider device, $h_\Sigma(x_{i1})$ is the dependent variable estimation value, and $X_{i1}$ is the independent variable.

4. The method according to claim 3, wherein the first data provider device is provided with a parameter server and multiple working nodes.

5. The method according to claim 2, wherein the first data provider device is provided with a parameter server and multiple working nodes.

6. The method according to claim 1, wherein the first data provider device is provided with a parameter server and multiple working nodes.

7. A non-transitory computer-readable storage medium comprising computer programs stored thereon, wherein the programs, when executed by a processor, cause the processor to implement the method according to claim 1.

8. A method for training a model based on federated learning, executed by a second data provider, comprising:
obtaining a second original independent variable calculated value according to a second model parameter and a second original independent variable of a second data provider device;
sending the second original independent variable calculated value to a first data provider device;
receiving, from the first data provider device, an encrypted difference between a dependent variable and a dependent variable estimation value; wherein the encrypted difference is obtained by the first data provider device encrypting a difference with a private key; the difference is calculated by the first data provider device and the dependent variable estimation value is calculated by the first data provider device according to a first model parameter initial value of the first data provider device, a first original independent variable of the first data provider device and the second original independent variable calculated value;
calculating an encrypted gradient of a loss function with respect to the second model parameter, according to a public key sent by the first data provider device, the encrypted difference, the second original independent variable of the second data provider device, and a random number;
sending to the first data provider device the encrypted gradient of the loss function with respect to the second model parameter;
receiving, from the first data provider device, a sum of the random number and a gradient of the loss function with respect to the second model parameter, wherein the sum of the random number and the gradient of the loss function with respect to the second model parameter is obtained by the first data provider device decrypting the encrypted gradient of the loss function with respect to the second model parameter with the private key; and updating the second model parameter according to the gradient of the loss function with respect to the second model parameter, wherein each of the second original independent variable calculated value, the dependent variable estimation value, and the difference between the dependent variable and the dependent variable estimation value is not encrypted data.

9. The method according to claim 8, wherein the calculating the encrypted gradient of the loss function with respect to the second model parameter, according to the public key sent by the first data provider device, the encrypted difference, the second original independent variable of the second data provider device, and the random number comprises:

calculating the encrypted gradient of the loss function with respect to the second model parameter by using the public key sent by the first data provider device and a following formula:

$$\left[\left[\frac{\partial L}{\partial \Theta^B}\right]\right] = -\frac{1}{n}\sum_{i=1}^{n}\left[\left[(y_i - h_\Theta(x_{i1}))\right]\right]x_i^B\left[\left[R_B\right]\right];$$

wherein n is a number of dependent variables, $y_i$ is a dependent variable, $x_i^B$ is the second original independent variable, B stands for the second data provider device, $h_\Sigma(x_{i1})$ is the dependent variable estimation value, $X_{i1}$ is a sum of independent variables, represents a homomorphism encryption.

10. The method according to claim 9, wherein the second data provider device is provided with a parameter server and multiple working nodes.

11. The method according to claim 8, wherein the second data provider device is provided with a parameter server and multiple working nodes.

12. A system for training a model based on federated learning, including a first data provider device comprising:
one or more processors; and
a storage device configured to store one or more programs, wherein
the one or more programs, when executed by the one or more processors, cause the one or more processors to:
receive a second original independent variable calculated value from a second data provider device; the second original independent variable calculated value being calculated by the second data provider device according to a second original independent variable and a second model parameter;
calculate a dependent variable estimation value according to a first model parameter initial value of the first data provider device, a first original independent variable of the first data provider device, and the second original independent variable calculated value;
calculate a difference between a dependent variable of the first data provider device and the dependent variable estimation value;
calculate a gradient of a loss function with respect to a first model parameter, according to the difference; and
update the first model parameter according to the gradient of the loss function with respect to the first model parameter;

wherein each of the second original independent variable calculated value, the dependent variable estimation value, the difference between the dependent variable of the first data provider device and the dependent variable estimation value, and the gradient of the loss function with respect to the first model parameter is not encrypted data, and wherein the one or more programs, when executed by the one or more processors, further cause the one or more processors to:
generate a pair of keys, and send a public key in the pair of keys to the second data provider device;
encrypt the difference by using a private key in the pair of keys to obtain an encrypted difference, and send the encrypted difference to the second data provider device;
receive an encrypted gradient of a loss function with respect to a second model parameter from the second data provider device, wherein the encrypted gradient of the loss function with respect to the second model parameter is obtained by the second data provider device performing a calculation on a random number and the encrypted difference with the public key;
decrypt, by using the private key in the pair of keys, the encrypted gradient of the loss function with respect to the second model parameter, to obtain a sum of the random number and the gradient of the loss function with respect to the second model parameter; and
send the sum of the random number and the gradient of the loss function with respect to the second model parameter to the second data provider device.

13. The system according to claim 12, wherein the one or more programs, when executed by the one or more processors, cause the one or more processors further to:
obtain a first original independent variable calculated value according to the first model parameter initial value of the first data provider device and the first original independent variable of the first data provider device;
add the first original independent variable calculated value and the second original independent variable calculated value, to obtain an independent variable; and
obtain the dependent variable estimation value by calculating a sigmoid function value of the independent variable.

14. The system according to claim 13, wherein the first data provider device is provided with a parameter server and multiple working nodes.

15. The system according to claim 12, wherein the one or more programs, when executed by the one or more processors, cause the one or more processors further to:
calculate the gradient of the loss function with respect to the first model parameter according to a following formula:

$$\frac{\partial L}{\partial \theta^A} = -\frac{1}{n}\sum_{i=1}^{n}(y_i - h_\theta(x_{i1}))x_i^A;$$

wherein n is a number of the dependent variables, $y_i$ is an original dependent variable, $x_i^A$ is the first original independent variable, 'A' stands for the first data provider device, $h_\Sigma(x_{i1})$ is the dependent variable estimation value, and $x_{i1}$ is the independent variable.

16. The system according to claim 12, wherein the first data provider device is provided with a parameter server and multiple working nodes.

* * * * *